US006961847B2

(12) United States Patent
Davies et al.

(10) Patent No.: US 6,961,847 B2
(45) Date of Patent: Nov. 1, 2005

(54) METHOD AND APPARATUS FOR CONTROLLING EXECUTION OF SPECULATIONS IN A PROCESSOR BASED ON MONITORING POWER CONSUMPTION

(75) Inventors: Robert L. Davies, Fremont, CA (US); Aaron M. Tsirkel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 10/103,282

(22) Filed: Mar. 20, 2002

(65) Prior Publication Data

US 2003/0182542 A1 Sep. 25, 2003

(51) Int. Cl.[7] .................................................. G06F 9/00
(52) U.S. Cl. ........................................ 712/235; 712/229
(58) Field of Search ................................ 712/235, 229, 712/220, 245, 207, 213

(56) References Cited

U.S. PATENT DOCUMENTS 5,719,800 A * 2/1998 Mittal et al. ................ 713/321
5,850,543 A * 12/1998 Shiell et al. ................ 712/238
6,167,524 A * 12/2000 Goodnow et al. .......... 713/300
6,282,663 B1 * 8/2001 Khazam ..................... 713/320

* cited by examiner

*Primary Examiner*—Henry W. H. Tsai
(74) *Attorney, Agent, or Firm*—Blakely, Sokoloff, Taylor and Zafman

(57) ABSTRACT

In accordance with one embodiment, the invention provides a method comprising monitoring a power consumption of a processor in executing a program while running in a speculative execution mode wherein instructions are speculatively executed; and turning off said speculative execution mode if said power consumption is above a predetermined threshold. According to another embodiment the invention provides a processor comprising a speculative mode wherein instructions are speculatively executed; a non-speculative execution mode wherein instructions are executed non-speculatively; and a speculation control mechanism to selectively cause said processor to operate in said non-speculative mode based on a power consumption criterion.

17 Claims, 4 Drawing Sheets

METHOD AND APPARATUS FOR CONTROLLING EXECUTION OF SPECULATIONS IN A PROCESSOR BASED ON MONITORING POWER CONSUMPTION

FIELD OF THE INVENTION

This invention relates to data processing. In particular it relates to the processing of instructions speculatively in a processor.

BACKGROUND

In order to improve computational throughput, a processor may have a pipeline and one or more speculation units which feed instructions speculatively to said pipeline for processing therein. One such speculation unit is a branch prediction unit which predicts whether a conditional branch in a program being executed will be taken or not so that instructions in the predicted branch can be prefetched without causing the pipeline to stall. Another type of speculation unit is known as an out-of-order execution unit. The task of the out-of-order execution unit is to reorder the flow of instructions to optimize performance as the instructions are sent down the pipeline and are scheduled for execution. Instructions are reordered to allow them to execute as quickly as possible as each input operand becomes ready. Out-of-order execution allows instructions following delayed instructions to execute as long as these instructions do not depend on the delayed instructions. Some processors have an execution trace building unit (trace cache) wherein already decoded instructions are stored in the form of program ordered sequences of microinstructions called traces. Most instructions in a program are fetched and executed from the trace cache. Only when there is a trace cache miss does the microarchitecture fetch and decode instructions from memory. Usually a trace cache has its own branch predictor that directs where instruction fetching needs to go next in the trace cache. Thus the trace cache branch predictor predicts return addresses speculatively and hence the trace cache can be considered to be another speculation unit.

Processors which execute instructions speculatively generally consume more power than processors which do not. Thus, for example, when running a notebook computer on battery power it may be more important to conserve power than to try to increase computational throughput by speculative execution.

DETAILED DESCRIPTION

According to one embodiment of the invention, there is provided a method comprising executing a first code in a program in a processor having at least one speculation unit to process instructions speculatively, said first code being to detect whether said processor is running on battery power; executing a second code in said program, said second code being to turn off each said speculation unit if said processor is running on battery power; and executing a remainder of said program after execution of said first and second codes.

According to another embodiment of the invention, there is provided a method comprising monitoring a power consumption of a processor in executing a program while running in a speculative execution mode wherein instructions are speculatively executed; and turning off said speculative execution mode if said power consumption is above a predetermined threshold.

According to another embodiment of the invention, there is a provided a processor comprising a speculative mode in which said processor executes instructions speculatively; a non-speculative mode in which said processor executes instructions non-speculatively; and a speculation control mechanism to selectively cause said processor to operate in said non-speculative mode based on a power consumption criterion.

According to a further embodiment of the invention, there is provided a method comprising detecting if a processor is running on battery power, said processor being able to operate in a speculative mode wherein instructions are speculatively executed, and a non-speculative mode wherein instructions are non-speculatively executed; and selectively causing said processor to operate in said non speculative mode, if said processor is running on battery power.

One advantage of the present invention is that it allows speculative execution in a processor to be turned off in order to conserve power. This is useful in cases where the processor is running on battery power.

Figure 1:
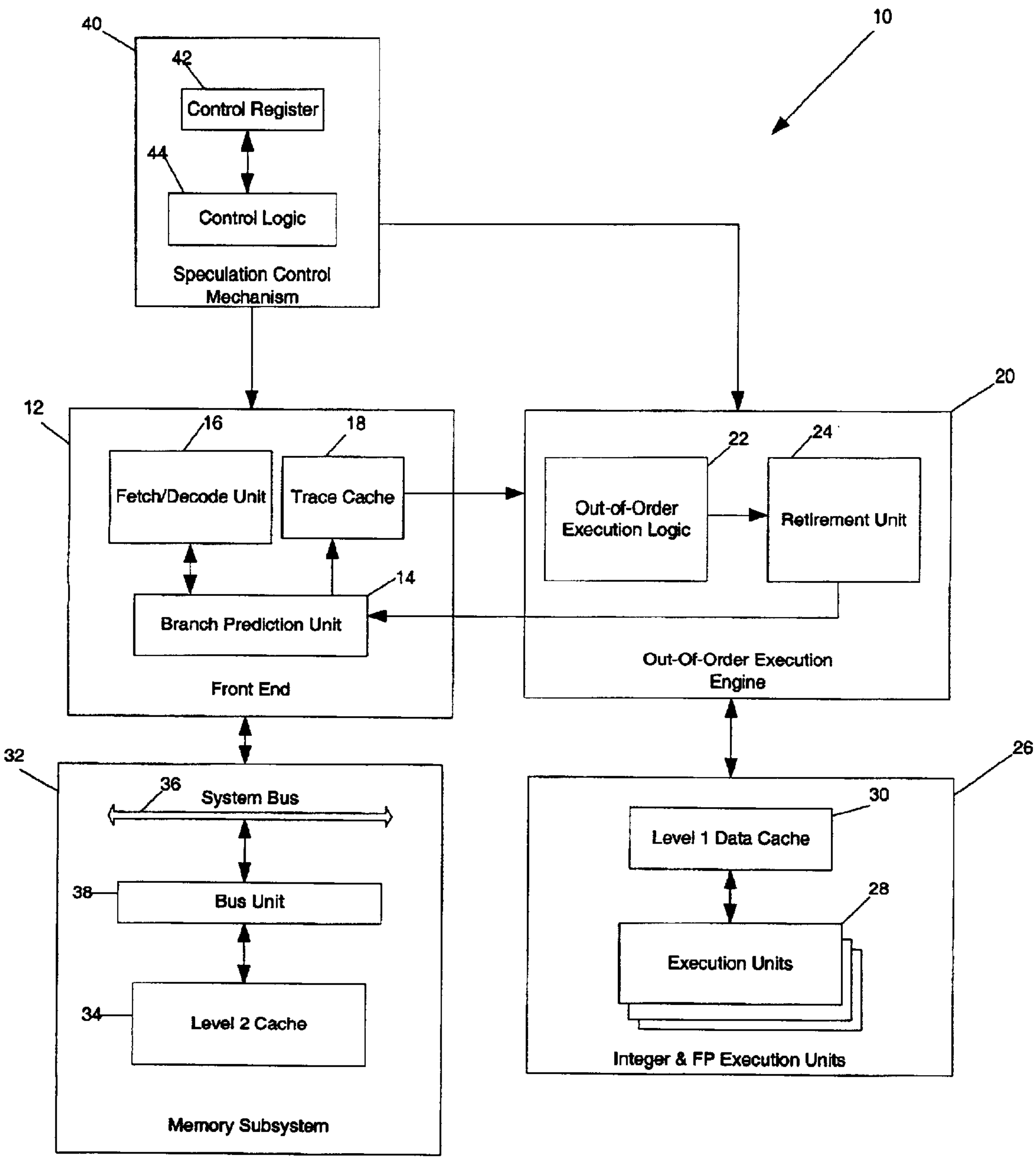
FIG. 1 shows a schematic drawing of a processor in accordance with one embodiment of the invention.

Referring to FIG. 1 of the drawings, reference numeral 10 generally indicates a processor in accordance with one embodiment of the invention. In FIG. 1, numerous specific details have been omitted so as not to obscure the present invention. Thus, only those components associated with the practice of the present invention are shown. The processor 10 includes an in-order-front end 12 which is responsible for fetching instructions to be executed next in a program and prepares them to be used later in a pipeline of the processor 10. In particular, in-order-front end 12 supplies a high bandwidth stream of decoded instructions to an out-of-order execution engine 20. In-order-front end 12 has a branch prediction unit 14 that uses the past history of program execution to speculate where the program is going to execute next. Branch prediction unit 14 supplies a predicted instruction address to a fetch/decode unit 16 which uses this address to prefetch instructions from a Level 2 cache 34 (see below). Fetch/decode unit 16 thereafter decodes these fetched instructions into basic operations called uops (micro-operations) that out-of-order execution engine 20 is able to execute. In-order-front end 12 also includes an execution trace cache 18. The trace cache 18 stores already decoded instructions or uops. Storing already decoded instructions avoids having to decode them again during execution. Thus, instructions are typically decoded once and placed in trace cache 18 and then used repeatedly from trace cache 18 like a normal instruction cache. Fetch/decode unit 16 is only used when a trace cache miss is generated.

Out-of-order execution engine 20 is where the instructions are prepared for execution. Out-of-order instruction engine 20 includes out-of-order execution logic 22 which has several buffers (not shown) which are used to smooth and reorder the flow of instructions to optimize performance as the instructions are sent down the pipeline and are scheduled for execution. Instructions are reordered to allow them to execute as rapidly as each input operand becomes ready. Out-of-order execution of instructions in a program allows instructions in the program following delayed instructions to execute as long as the instructions do not depend on the delayed instructions. Out-of-order execution engine 20 further includes a retirement unit 24 which reorders the instructions executed out-of-order, back to the original program order. Retirement unit 24 receives the completion status of the executed instructions from each execution units (see below) and processes the results so that the proper architectural state is retired according to program order. Retirement unit 24 reports branch history information to the branch prediction unit 14 so that the latest known branch history can be used to fine tune branch prediction.

Processor 10 further includes integer and floating point (FP) execution units 26 where the instructions are actually executed. Each execution unit 26 includes register files (not shown) that store integer and floating point data operand values that instructions need to execute. Each execution unit 26 includes several types of integer and floating point execution units 28 that do the actual computations. A Level 1 data cache 30 is used for most load install operations to and from each execution unit 28.

A memory subsystem 32 associated with processor 10 is also shown in FIG. 1 of the drawings. Memory subsystem 32 includes a Level 2 cache 34 and a system bus 36. The Level 2 cache 34 stores both instructions and data that cannot fit in execution trace cache 18 and Level 1 data cache 30. System bus 36 is connected to Level 2 cache 34 via a bus unit 38 which is used to access main memory when L2 cache 34 has a cache miss, and to access the system I/O resources.

Processor 10 includes a speculation control mechanism 40 which causes processor 10 to operate selectively in a speculative mode and in a non-speculative mode wherein instructions are executed speculatively and non-speculatively respectively. Speculation control mechanism 40 includes a control register 42 having three settable bits each being associated with a specific speculation unit. For example, the first settable bit is associated with branch prediction unit 14, the second settable bit is associated with trace cache 18 and the third settable bit is associated with out-of-order execution engine 20. Each of the settable bits is set by control logic 44 during execution of an application program being run on processor 10, based on a power consumption criterion.

Figure 2:
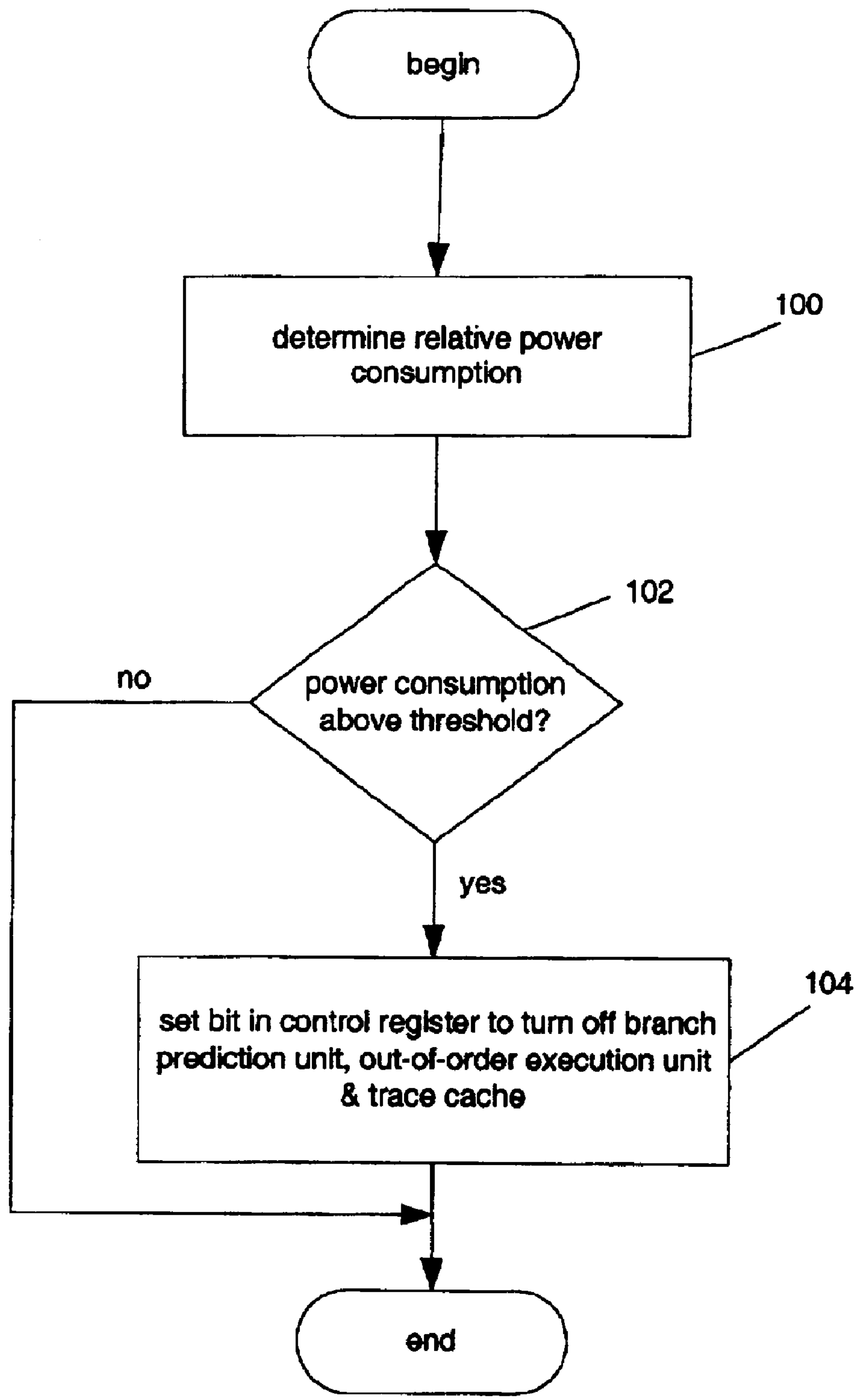
FIG. 2 shows a flow chart of operations performed in accordance with one embodiment of the invention.

FIG. 2 of the drawings shows a flow chart of operations performed in setting the bits of control register 42 according to one embodiment of the present invention. Referring to FIG. 2, at block 100 a relative power consumption of processor 10 in executing a program in speculative mode relative to executing the program in non-speculative mode is determined. At block 102 the relative power consumption is compared against a predetermined threshold. If the relative power consumption is above the predetermined threshold then at block 104 a bit in control register 42 is set in order to turn off each unit in processor 10 which performs speculation. As noted above, these units include branch prediction unit 14, out-of-order execution unit 20, and trace cache 18. Typically, a bit is set for each unit to be turned off.

Figure 3:
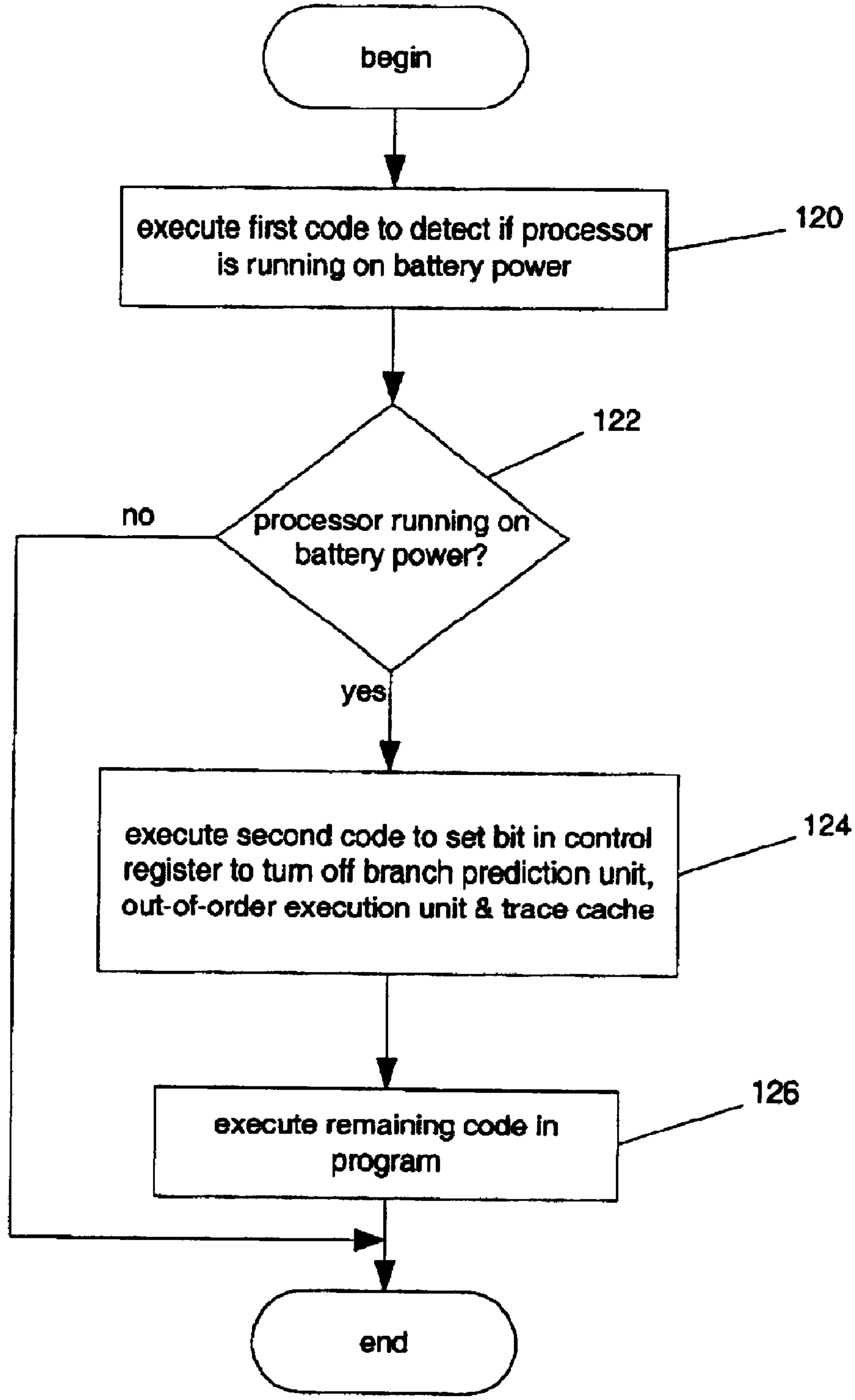
FIG. 3 shows a flow chart of operations performed in accordance with another embodiment of the invention.

FIG. 3 of the drawings shows another embodiment of the present invention, which is useful in conserving power consumed by processor 10 when running on battery power. Referring to FIG. 3, at block 120 a first code in a program is executed to detect if processor 10 is running on battery power. At block 122 a check is performed to detect whether processor 10 is running on battery power. If the processor 10 is running on battery power then at block 124 a second code in the program is executed to set each bit in the control register 42 to respectively turn off branch prediction unit 14, out-of-order execution unit 20 and trace cache 18 of processor 10. At block 126 the remaining instructions in the program are executed. It will be appreciated that by executing the process shown in FIG. 3 of the drawings, speculative execution may be selectively turned off in the processor if processor 10 is running on battery power. This leads to an extended battery life.

Figure 4:
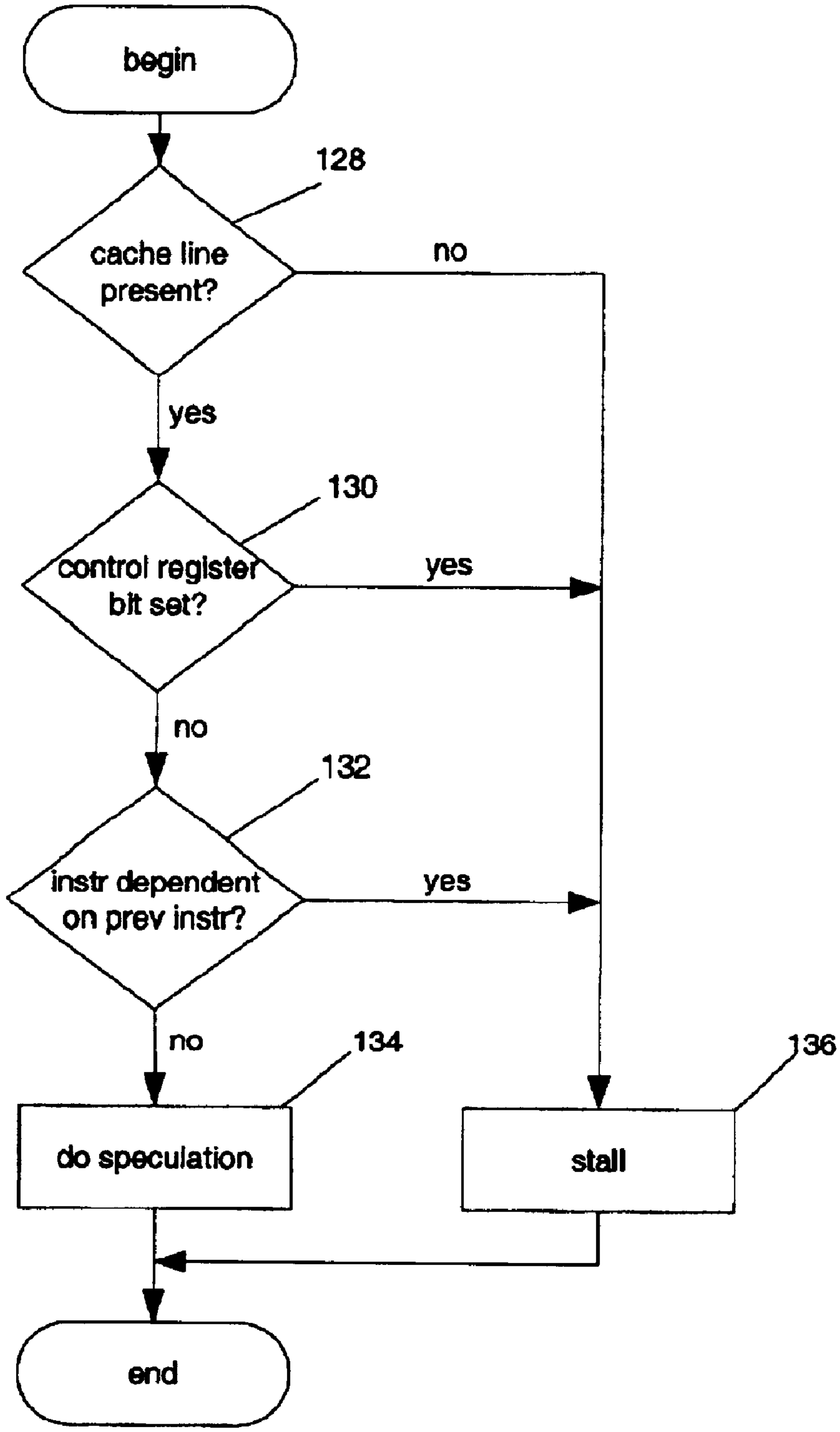
FIG. 4 shows a flow chart of operations performed in executing one of the operations shown in FIG. 3.

FIG. 4 of the drawings shows a sequence of operations which are performed in executing block 126 of FIG. 3 according to one embodiment of the invention. Referring to FIG. 4, at block 128 a determination is made as to whether a cache line is present in trace cache 18. If no cache line is present, which is indicative of a trace cache miss, then at block 136 processor 10 stalls. If a trace cache line is present then at block 130 it is determined whether the bit in the control register 42, which is associated with trace cache 18, has been set. If the bit has been set, which indicates that speculative execution is to be switched off, then processor 10 stalls at block 136. If the control register bit has not been set, then at block 132 it is determined if the next instruction to be executed is dependent on the previous instruction. If no dependency is established then at block 134 speculative execution is performed, otherwise processor 10 is stalled at block 136.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:

executing a first code a program in a processor having at least one speculation unit to process instructions speculatively, said first code being to detect whether said process is running on battery power;

executing a second code in said program to turn off each said speculation unit if said processor is running on battery power, said executing the second code to set a bit in a control register associated with said speculation unit;

a control logic of the processor switching off the speculation unit if the bit is set; and executing a remainder of said program after execution of said first and second codes.

2. The method of claim 1, wherein each said speculation unit is selected from a group consisting of a branch prediction unit; an out-of-order execution unit; and an execution trace building unit.

3. The method of claim 2, wherein said processor comprises a speculation control mechanism which includes the control register having a bit associated with each of said branch prediction unit, out-of-order execution unit, and execution trace building unit; and the control logic to switch off each of said branch prediction unit, out-of-order execution unit, and execution trace building unit if its associated bit is set, executing said second code then including causing each said bit in said control register to be set.

4. The method of claim 3, wherein executing said remainder comprises causing each said bit in said control register to be reset when execution of said program terminates.

5. A method comprising:

monitoring a power consumption of a processor in executing a program while running in a speculative execution mode wherein instructions are speculatively executed; and turning off said speculative execution mode if said power consumption is above a predetermined threshold, wherein said processor comprises a speculation control mechanism to switch said processor between said speculative execution mode and a non-speculative execution mode, turning off said speculative execution mode including setting a bit in a control register which when read by said speculation control mechanism causes said processor to operate in said non-speculative execution mode.

6. The method of claim 5, wherein said power consumption is a relative power consumption of said processor in executing said program in said speculative execution mode and said non-speculative execution mode respectively.

7. A processor comprising:

a speculative mode in which said processor executes instructions speculatively;

a non-speculative mode in which said processor executes instructions non-speculatively; and a speculation control mechanism to selectively cause said processor to operate in said non-speculative mode based on a power consumption criterion turning off said speculative execution mode including setting a bit in a control register which when read by said speculation control mechanism causes said processor to operate in said on-speculative execution mode.

8. The processor of claim 7, wherein said power consumption criterion comprises a power consumed by said processor when operating in said speculative mode relative to when said processor operates in said non-speculative mode being above a predetermined threshold.

9. The processor of claim 7, wherein said power consumption criterion comprises whether said processor is running on battery power.

10. The processor of claim 7, wherein said speculation control mechanism receives input from an application program to cause said processor to operate in said non-speculative mode.

11. A processor comprising:

means for operating a speculative mode wherein instructions are speculatively executed;

means for operating a non-speculative mode, wherein instructions are executed non-speculatively;

means for causing said processor to operate in said non-speculative mode based on power consumption criterion, including means for setting a bit in a control register which when read causes said processor to operate in said non-speculative execution mode, wherein said means for selectively causing said processor to operate in said non-speculative mode is to receive input from an application program executing in said processor to cause said processor to operate in said non-speculative mode.

12. The processor of claim 11, wherein said power consumption criterion comprises a power consumed by said processor when operating in said speculative mode relative to when operating in said non-speculative mode being above a predetermined threshold.

13. The processor of claim 11, wherein said power consumption criterion comprises whether said processor is running on battery power.

14. A method comprising:

detecting if a processor is running on battery power, said processor being able to operate in a speculative mode wherein instructions are speculatively executed, and a non-speculative mode wherein instructions are non-speculatively executed; and selectively causing said processor to operate in said non-speculative mode, if said processor is running on battery power, wherein selectively causing said processor to operate in aid non-speculative mode comprises setting a bit in a control register which when read causes said processor to operate in said non-speculative mode.

15. A computer-readable medium having stored thereon a sequence of instructions which when executed by a processor capable of running in a speculative mode wherein instructions are speculatively executed and in a non-speculative mode wherein instructions are non-speculatively executed, causes said processor to perform a method comprising:

detecting if said processor is running on battery power; and selectively causing said processor to operate in said non-speculative mode if said processor is operating on battery power, wherein selectively causing said processor to operate in said non-speculative mode comprises setting a bit in a control register which when read causes said processor to operate in said non-speculative mode.

16. A computer-readable medium having stored thereon a sequence of instructions which when executed by a processor capable of operating in a speculative mode wherein instructions are speculatively executed and in a non-speculative mode wherein instructions are non-speculatively executed, causes said processor to perform a method comprising:

monitoring a power consumption of said processor in executing a program while running in said speculative execution mode; and turning off said speculative execution mode if said power consumption is above a predetermined threshold, wherein said processor comprises a speculation control mechanism to switch said processor between said speculative execution mode and a non-speculative execution mode, turning off said speculative execution mode including setting a bit in a control register which when read by said speculation control mechanism causes said processor to operate in said non-speculative execution mode.

17. The computer-readable medium of claim 16, wherein said power consumption is a relative power consumption of said processor in executing said program in said speculative execution mode and said non-speculative execution mode respectively.

* * * * *